Aug. 28, 1928.

E. W. ARNOLD 1,682,465

WELTING

Filed Dec. 17, 1927

Inventor:
Edmund W. Arnold
By Henry T. Williams,
Attorney

Patented Aug. 28, 1928.

1,682,465

UNITED STATES PATENT OFFICE.

EDWARD W. ARNOLD, OF NORTH ABINGTON, MASSACHUSETTS.

WELTING.

Application filed December 17, 1927. Serial No. 240,717.

The invention to be hereinafter described relates to weltings for use in the manufacture of shoes.

In my copending application Serial No. 199,593, filed June 17, 1927, is disclosed welting comprising a strip of leather incised through the grain face of the strip intermediate the inner and outer edges thereof to form a feather which partially overlies and is secured to a filler presenting a bead adapted to be located closely against the upper where the latter meets the insole. In said application the filler is shown as formed of a solid piece of rubber.

One of the purposes of the present invention is to provide welting of the same general form as that disclosed in said application, but a different filler is employed. This filler, in the present instance comprises a sheath of leather wrapped about a core and having flanges projecting beyond the core and secured together. The core may be of rolled paper having the convolutions thereof secured together by an adhesive. The feather will overlie the flanges of the filler.

Another purpose of the invention is to provide stitching which will reliably secure the feather, the flanges of the filler and the body of the strip together, and prevent any possibility of the edge of the feather curling up away from the filler.

The character of the invention may be best understood by reference to the following description of one good form thereof shown in the accompanying drawing, wherein:

Fig. 1 on an enlarged scale is a perspective view of a portion of the leather strip forming the bead of the welting;

Figure 1:
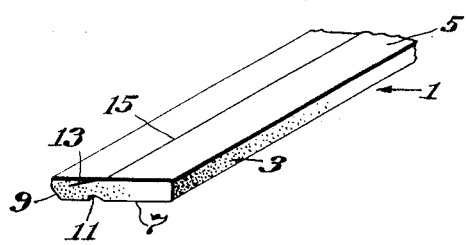
Figure 3:
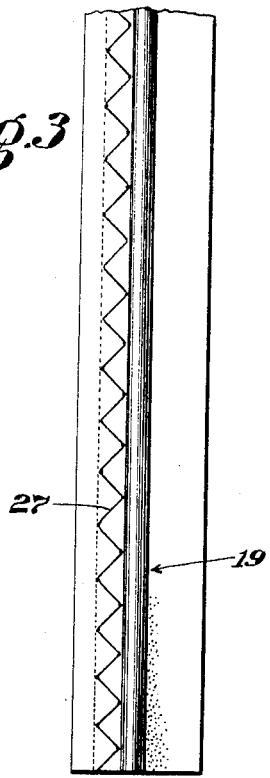
Fig. 3 is a plan of a portion of the complete welting.
Figure 2:
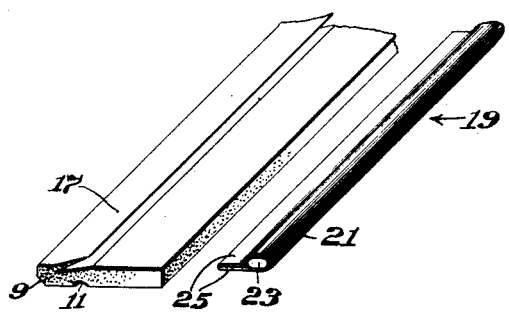
Fig. 2 is a perspective view of the strip with the slit therein and the filler for insertion into the groove formed by the slit.
Figure 4:
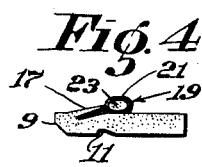
Fig. 4 is an end view of the welt shown in Fig. 3.

Referring to the drawing, 1 (Fig. 1) designates a strip of leather formed by slitting the same from stock, and preferably with its outer edge 3 perpendicular to the grain face 5 and flesh face 7 of the strip, and with the inner edge 9 oblique to said faces. A stitching receiving groove 11 is formed in the flesh face of the strip adjacent the inner edge thereof. A slit 13 is incised in the strip cutting through the grain face thereof along the line 15 intermediate the inner and outer edges of the strip. This slit in the present instance is inclined from said line relatively to the grain face, and extends toward the inner edge of the strip to a substantial depth, thereby forming a longitudinal feather 17 integral with the body of the strip and tapered from its juncture with the body toward the free edge of the feather.

The filler 19 comprises a sheath 21 which may be of leather and wrapped about a core 23 with the grain face of the sheath outermost. The core may be formed of a roller of paper having its convolutions secured together by an adhesive. Flanges of the sheath project beyond the core in superimposed relation and secured together by a suitable adhesive. Then the filler is presented to the strip, and its flanges are introduced into the groove between the feather and the body of the strip. The relation of the feather and flanges is such that the feather may overlie the flanges and extend to the line of juncture of the flanges with the bead or portion of the sheath wrapped about the core.

Next the feather and filler are secured to the body of the welting preferably by a zig-zag line of stitching 27 which extends from the base of the feather to the free edge thereof. This zig-zag line of stiching is a desirable feature, since points of the stitching may extend to the edge of the feather at close intervals, and thereby prevent said edge from curling up away from the filler, and at the same time prevent any possibility of the edge breaking away from the stitching. The stitching receiving channel 11 referred to, is suitably located adjacent the inner edge of the welting to receive the inseam stitching and is opposite the flanges of the filler and opposite the feather, so that the stitching will be sure to pass through all of them.

The welting described in simple and cheap in construction and easy to manufacture in proper form. While it is strong, it is easily flexible transversely to the length thereof, and may be readily bent around the toe of the upper of a shoe. The provision of the feather formed as described of substantial width and overlying the flanges of the feather, presents a grain surface against the upper and in the angle between the feather and lip of the inner sole. The exposed portion of the filler is in the form of a bead beyond the edge of the feather, and since it is formed of leather and has its grain face outermost, it presents a finished appearance, desirably sets into the angle between the upper and the body of the welting, and assists in supporting the upper and in holding its shape.

It will be understood that the invention is not limited to the specific embodiment shown, and that various deviation may be made therefrom without departing from the spirit and scope of the appended claims.

What is claimed is:

1. As an article of manufacture, welting for use in making welt shoes comprising a leather strip having flesh and grain faces and a slit incised through the grain face and extending toward the inner edge of the strip thereby forming a longitudinal feather, a filler having a portion of its width between the feather and the body of the strip, and a zig-zag line of stitching extending through the feather, filler and the body of the strip.

2. As an article of manufacture, welting for use in making welt shoes comprising a leather strip having flesh and grain faces and a slit incised through the grain face along a line intermediate the inner and outer edges of the strip and forming a feather, a filler comprising a bead, and a flange beneath the feather, and a zig-zag line of stitching extending through the feather, flange and body of the strip, said zig-zag line of stitching having points extending at intervals to the edge of the feather.

3. As an article of manufacture, welting for use in making welt shoes comprising a leather strip having flesh and grain faces and a slit incised through the grain face intermediate the inner and outer edges of the strip, extending toward the inner edge of the strip and forming a feather, a filler having a bead, and a flange beneath the feather, and a line of stitching passing through the feather, filler and body of the strip.

EDWARD W. ARNOLD.